(12) United States Patent
Kuchi et al.

(10) Patent No.: US 7,830,975 B2
(45) Date of Patent: Nov. 9, 2010

(54) I/Q MIMO DETECTION FOR SINGLE ANTENNA INTERFERENCE CANCELLATION

(75) Inventors: Kiran Kumar Kuchi, Irving, TX (US); Jianzhong Zhang, Irving, TX (US)

(73) Assignee: Nokia Corporation, Espoo (FI)

( * ) Notice: Subject to any disclaimer, the term of this patent is extended or adjusted under 35 U.S.C. 154(b) by 841 days.

(21) Appl. No.: 10/823,196

(22) Filed: Apr. 12, 2004

(65) Prior Publication Data

US 2005/0226344 A1    Oct. 13, 2005

(51) Int. Cl.
*H04B 7/02*    (2006.01)
(52) U.S. Cl. ..................... 375/267
(58) Field of Classification Search ......... 375/267, 375/148, 346, 347
See application file for complete search history.

(56) References Cited

U.S. PATENT DOCUMENTS

| | | | | |
|---|---|---|---|---|
| 5,848,105 | A * | 12/1998 | Gardner et al. | 375/336 |
| 6,304,618 | B1 * | 10/2001 | Hafeez et al. | 375/341 |
| 6,400,928 | B1 * | 6/2002 | Khullar et al. | 455/67.11 |
| 6,563,884 | B1 * | 5/2003 | Nikula | 375/295 |
| 6,898,248 | B1 * | 5/2005 | Elgamal et al. | 375/259 |
| 6,944,434 | B2 | 9/2005 | Mattellini et al. | |
| 7,107,031 | B2 * | 9/2006 | Kristensson et al. | 455/296 |
| 7,184,474 | B2 * | 2/2007 | Molev-Shteiman et al. | 375/231 |
| 7,212,566 | B2 * | 5/2007 | Zhang et al. | 375/229 |
| 7,313,204 | B2 * | 12/2007 | Yang | 375/322 |
| 2002/0015437 | A1 * | 2/2002 | Li et al. | 375/146 |
| 2002/0141437 | A1 * | 10/2002 | Meyer et al. | 370/442 |
| 2003/0053535 | A1 * | 3/2003 | Malkov et al. | 375/233 |
| 2003/0202574 | A1 * | 10/2003 | Budka et al. | 375/227 |
| 2004/0042535 | A1 * | 3/2004 | Mayor et al. | 375/150 |
| 2004/0192215 | A1 * | 9/2004 | Onggosanusi et al. | 455/67.13 |
| 2004/0198296 | A1 * | 10/2004 | Hui et al. | 455/296 |
| 2004/0259504 | A1 * | 12/2004 | Onggosanusi et al. | 455/67.13 |
| 2004/0259517 | A1 * | 12/2004 | Takahashi et al. | 455/295 |
| 2005/0095985 | A1 * | 5/2005 | Hafeoz | 455/67.11 |
| 2005/0105646 | A1 * | 5/2005 | Arslan et al. | 375/316 |
| 2005/0111596 | A1 * | 5/2005 | Olsson et al. | 375/346 |

FOREIGN PATENT DOCUMENTS

| | | |
|---|---|---|
| EP | 1 492 288 A2 | 12/2004 |
| WO | WO-01/93439 A1 | 12/2001 |

(Continued)

OTHER PUBLICATIONS

Zhang et al ("Reduced-State MIMO sequence estimation for EDGE systems" Signals, Systems and Computers, 2002. Conference Record of the Thirty-Sixth Asilomar Conference, Nov. 3-6, 2002, vol. 1 pp. 541-545).*

(Continued)

*Primary Examiner*—David C Payne
*Assistant Examiner*—Leon-Viet Q Nguyen
(74) *Attorney, Agent, or Firm*—Harrington & Smith

(57) ABSTRACT

An I/Q MIMO detection framework is a practical means to realize interference cancellation (IC) gains when GMSK, 8PSK signals interfere with each other in synchronous GSM/EDGE networks, thereby providing coverage, capacity, and throughput gain. Further, the presented algorithm applies to a high data rate system concept, in which multiple signals are transmitted from the base station (BTS) through multiple antennas.

42 Claims, 1 Drawing Sheet

FOREIGN PATENT DOCUMENTS

| WO | WO 02/102008 A1 | 12/2002 |
|---|---|---|
| WO | WO-03/030478 A1 | 4/2003 |
| WO | WO 03/073630 A1 | 9/2003 |

OTHER PUBLICATIONS

Hafeez et al ("Interference cancellation for EDGE via two-user joint demodulation", Vehicular Technology Conference, 2003. VTC 2003-Fall. 2003 IEEE 58th, Publication Date: Oct. 6-9, 2003, vol. 2, On pp. 1025-1029).*

Laurent, "Exact and Approximate Construction of Digital Phase Modulations by Superposition of Amplitude Modulated Pulses (AMP)", Feb. 1986, pp. 150-160, IEEE Transactions on Communications, vol. COM-34, No. 2.

Kaleh, "Simple Coherent Receivers for Partial Response Continuous Phase Modulation", Dec. 1989, pp. 1427-1436, IEEE Journal on Selected Areas in Communications, vol. 7, No. 9.

Picinbono et al., "Widely Linear Estimation with Complex Data", Aug. 1995, pp. 2030-2033, IEEE Transactions on Signal Processing, vol. 43, No. 8.

Trigui, et al., "Cochannel Interference Cancellation Within the Current GSM Standard", 1998, pp. 511-515, Institut EURECOM, France.

Gerstacker et al., "Equalization with Widely Linear Filtering", Jun. 24-29, 2001, p. 265, ISIT2001, Washington, DC.

Gerstacker et al., "Receivers with Widely Linear Processing for Frequency-Selective Channels", Sep. 2003, pp. 1512-1523.

H. Trigui et al., "Training Sequence Aided Multichannel Identification in the Presence of Interference and Noise", GLOBECOM, 1998, 6 pgs.

H. Trigui, et al., "Training Sequence Based Multiuser Channel Identification for Cochannel Interference Cancellation In GSM", APAWC 1999, 4 pgs.

S. Grant, et al., "Performance Enhancement Through Joint Detection of Cochannel Signals Using Diversity Arrays", IEEE, vol. 46, No. 8, Aug. 1998, pp. 1038-1049.

S. Grant, et al., Further Analytical Results on the Joint Detection of Cochannel Signals Using Diversity Arrays, IEEE, vol. 48, No. 11, Nov. 2000, pp. 1788-1792.

Marco Chiani, et al., "New Exponential Bounds and Approximations for the Computation of Error Probability in Fading Channels", IEEE, vol. 2, No. 4, Jul. 2003, pp. 840-845.

M. Vedat Eyuboglu, et al., "Reduced-State Sequence Estimation with Set Partitioning and Decision Feedback", IEEE, vol. 36, No. 1, Jan. 1988, pp. 13-20.

R. Jana, et al., "Distance Spectrum Computation for Equalized MIMO Multipath Fading Channels", IEEE 2000, pp. 293-297.

D. Williamson, et al., "Block Decision Feedback Equalization", IEEE, vol. 40, No. 2, Feb. 1992, pp. 255-264.

Philips, "SAIC Link Performance for 8-PSK Interference (rev.)", 3GPP TSG GERAN #16, Tdoc GP-031965, Aug. 2003, 5 pgs.

Cingular, "SAIC System Level Evaluations based on Network Data from a Real Cellular System", 3GPP TSG GERAN #15, Tdoc GP-031271, Jun. 2003, 8 pgs.

Cingular, "Single Antenna Interference Cancellation in MS for GSM Networks", 3GPP TSG GERAN #9, GP-021013, Apr. 2002, 4 pgs.

N. Nefedov, et al., "Turbo Equalization and Iterative (Turbo) Estimation Techniques for Packet Data Transmission", Proc. Of Int. Symp. On Turbo Codes, Sep. 2000, pp. 423-426.

N. Al-Dhahir et al., "The Finite-Length Multi-Input Multi-Output MMSE-DFE", IEEE, vol. 48, No. 10, Oct. 2000, pp. 2921-2936.

C. Douillard, et al., "Iterative Correction of Intersymbol Interference: Turbo-Equalization", European Trans Telecommunications, vol. 6, No. 5, Sep./Oct. 1995, pp. 507-511.

Gelli et al., "Blind Widely Linear Multiuser Detection", IEEE Comm. Lett., vol. 4, No. 6, Jun. 2000.

Austin, "SAIC and Synchronized Networks for Increased GSM Capacity", 3G Americas' SAIC Working Group, Sep. 2003.

* cited by examiner

I/Q MIMO DETECTION FOR SINGLE ANTENNA INTERFERENCE CANCELLATION

TECHNICAL FIELD

The field of the invention is that of processing interfering RF signals in a system having two or more signals that interfere with one another, in particular interference cancellation.

The present invention applies to Enhanced Data Rates for a GSM Evolution (EDGE) system in which two different modulation formats are used namely binary Gaussian Minimum Shift Keying (GMSK) and 8 level Phase Shift Keying (8PSK).

BACKGROUND OF THE INVENTION

As more signals are sent within a fixed amount of RF spectrum, there are more occasions when signals interfere with another signal that is intentionally transmitted along the same channel, rather than being random noise. When frequency spectrum is available on a limited basis as in cellular or PCS systems, the same frequency is reused in geographically distinct regions (or cells) to maximize the spectrum efficiency. The overall system capacity is generally limited by the interference caused by the reused frequencies.

Interference cancellation (IC) is traditionally achieved by the use of multiple antennas at the receiver terminal. However addition of antennas at the receiver significantly adds to the receiver cost. On the other hand IC using a single antenna is an attractive way to increase system capacity since it eliminates the need for additional RF hardware cost since the algorithm can be implemented digitally in base band.

The recently discovered single antenna interference cancellation (SAIC) algorithms are specifically tailored for GMSK signal detection in the presence of GMSK interferers. The ICUPC 1998 paper "Cochannel Interference Cancellation within current GSM Standard" written by Trigui and Slock exploits the special properties of GMSK modulation for SAIC.

A number of other SAIC approaches have also been proposed in the literature. Examples include: Ottersen, Kristensson, Astely, "A receiver", International Publication Number WO 01/93439; Arslan, Khayrallah, "Method and Apparatus for Canceling Co-Channel Interference in a Receiving System Using Spatio-Temporal Whitening" International Publication Number WO 03/030478 A1; Meyer, Schober, Gerstacker, "Method for Interference Suppression for TDMA- and/or FDMA Transmission", filed Dec. 19, 2001. Also of interest are B. Picinbono and P. Chevalier, "Widely Linear Estimation with Complex Data," IEEE Trans. On. Signal Proc, vol. 43, pp. 2030-2033, August, 1995; W. H. Gerstacker et al, "Equalization with Widely Linear Filtering," ISIT2001; W. A. Gardner, S. V. Schell, "GMSK Signal Processors For Improved Communications Capacity and Quality, U.S. Pat. No. 5,848,105, Dec. 8, 1998;

The above-mentioned prior art is relevant for SAIC for GMSK signals or any other real modulation signals. However the literature has not dealt with IC techniques involving both real and complex modulation alphabets such as GMSK and 8PSK signals, which are encountered in GSM/EDGE systems. If SAIC gains are to be maximized in EDGE deployments it is necessary to develop a mobile receiver that has interference cancellation capability irrespective of the interference modulation type.

IC methods are generally categorized into two classes namely blind IC, and Joint detection (JD). By "blind", we mean that the channel parameters of the interfering signal are not known at the receiver and that the interfering signal is not detected together with the desired signal as in JD. The paper titled "The Finite-Length Multi-Input Multi-Output MMSE-DFE written by Al-Dhahir and Sayed may be a useful approach for JD, though it does not handle GMSK-8PSK IC. Significant improvement would be required to extend this technique to the GMSK-8PSK IC problem. So far no prior art is reported on IC involving 8PSK and GMSK signals.

The art would benefit from a system and method that is able to suppress interference between 8PSK and GMSK signals.

SUMMARY OF THE INVENTION

The invention relates to a method for using interference cancellation with various combinations of signals; e.g. GMSK and 8PSK in various combinations.

A feature of the invention is the detection of real and imaginary parts of an incoming set of signals that include at least one complex signal.

A feature of the invention is the rotation of the incoming complex signal, if necessary (as in the case of GMSK) using parameters supplied by previous estimations or by a base station so that the imaginary component of the GMSK signal is eliminated.

Another feature of the invention is using an MIMO process on at least three input signals: the real GMSK signal and the real and imaginary components of the 8PSK signal.

Another feature of the invention is a high data rate system in which deliberate interference is created by transmitting multiple signals from the same base station through spatially separated antennas. At the receiver, signal separation is performed through interference cancellation, without having multiple receive antennas.

For instance, the peak data rates for GPRS can be improved by a factor of 2 by transmitting two GMSK signals, and EDGE peak data rates can be improved by 4/3 or 2 by transmitting GMSK-8PSK or 8PSK-8PSK signals simultaneously.

DETAILED DESCRIPTION

Figure 1:
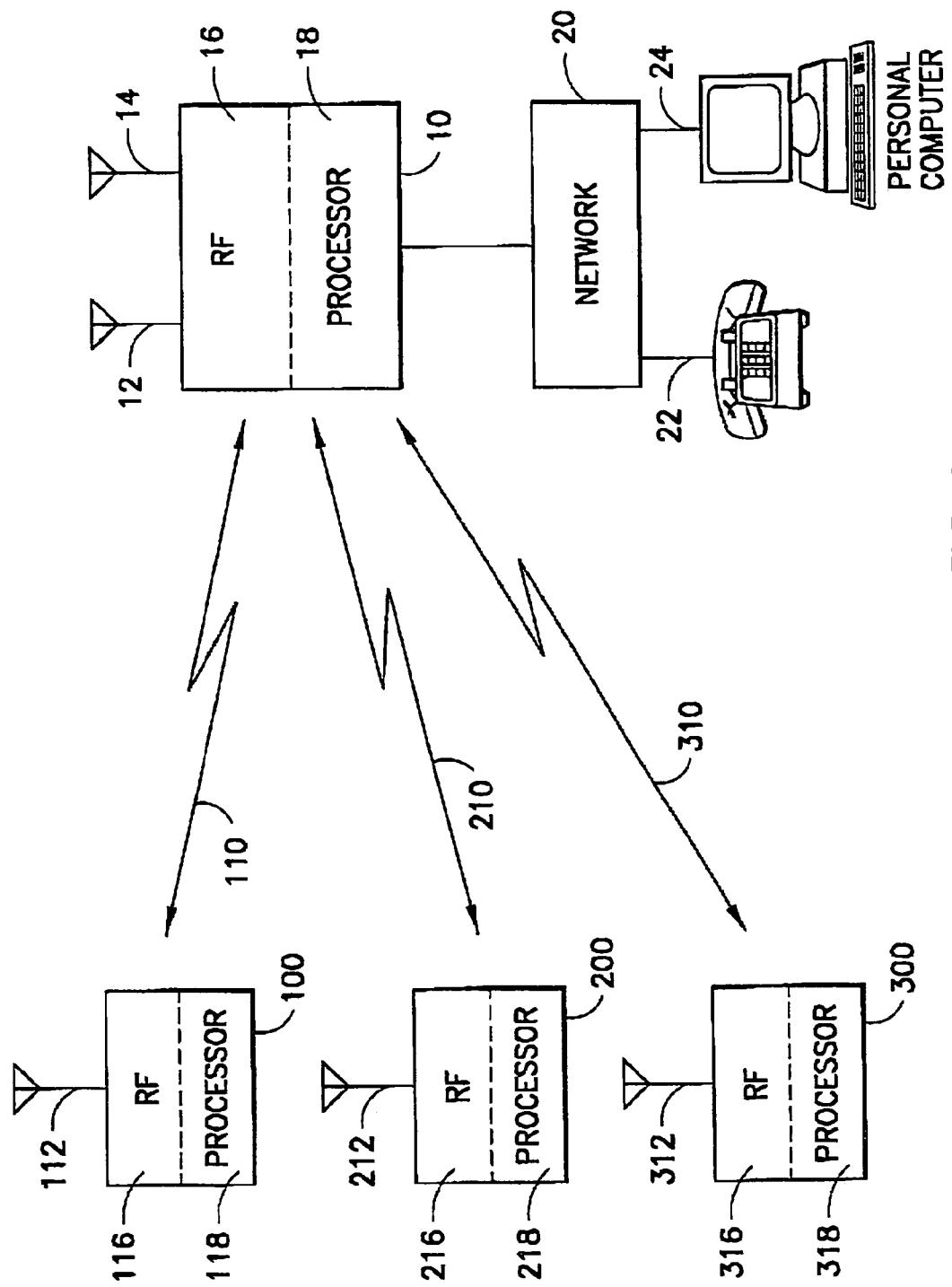
FIG. 1 illustrates a block diagram of a system employing the invention.

FIG. 1 illustrates a simplified block diagram of a portion of a telecommunications system in which base station 10 communicates with three or more mobile stations 100, 200 and 300. Station 10 is connected to a network 20, which may be a switched telephone (voice or data) network having as input voice handsets 22 and/or data terminals 24.

Mobile stations 100-300 have single or multiple antennas 112, 212 and 312, respectively and communicate with the base station over channels 110, 210 and 310. Illustratively, base station 10 has two or more antennas 12 and 14. Base station 10 is capable of transmitting GMSK and/or 8PSK signals. Within base station 10, RF unit 16 handles the RF (and IF) signals, while processor unit 18 handles manipulation of the baseband signals. Counterpart units 116, 216 and 316 for RF and 118, 218 and 318 for baseband are located within the mobile stations 100-300.

The invention exploits the special properties of GMSK/BPSK signaling for improved signal detection when GMSK/BPSK and 8PSK signals interfere with each other. Unlike conventional detection methods, the invention relies on novel detection methods that detect the real (I) and imaginary (Q) parts of a combination of complex and real modulation alphabets for improved signal processing.

We adopt the following notation throughout. The desired modulation type is mentioned first, followed by the dominant interferer modulation type e.g. in station 100, the signals are GMSK-8PSK; in station 200, the signals are 8PSK-GMSK; and in station 300 the signals are 8PSK-8PSK. The receiver processing assumes a linearized GMSK signal model as specified in the papers by Laurent, "Exact and Approximate Construction of Digital Phase Modulations by superposition of Amplitude Modulated Pulses (AMP) and Kaleh, "Simple Coherent Receivers for Partial Response Continuous Phase Modulation".

In an illustrative example, station 10 is transmitting to mobile unit 100 and to mobile unit 200 using 8PSK and/or GMSK on the same frequency band for both transmissions, so that each mobile unit will have interference. The type and significance of the interference will vary.

In the following discussion, the channel parameters h are assumed to be known. When the interfering signal comes from the same base station as the data, the base station can transmit to each mobile unit the relevant parameters of the interfering channel, thereby reducing the time spent by the mobile unit in estimating those parameters. When the interfering signal comes from a different base station, the mobile unit will have to perform a conventional estimation process.

In a first example, the base station transmits data on the same channel in both GMSK and 8PSK formats to mobile station 100. Station 100 uses techniques according to the invention to detect the data in both formats, thus increasing the bandwidth.

In a second example, the base station transmits two different signals (GMSK or 8PSK) using two antennas to two mobile units and cochannel interference (8PSK or GMSK) comes from the same base station.

In a third example, the base station transmits a signal (GMSK or 8PSK) to a mobile unit and (8PSK or GMSK) cochannel interference comes from a different base station.

After converting from RF to baseband, a linearized GMSK signal representation for simplified receiver processing is used to de-rotate the received signal, which is a sum of one GMSK and one 8PSK signal, with a factor exp $(-jk\pi/2)$ (where k is the symbol time index), such that all the component GMSK signals will be forced to be binary modulated. There are three data streams—a real-only stream from the GMSK data and a real and imaginary data streams from the 8PSK data.

This disclosure is directed at single antenna reception and joint detection of at least two signals having same or different modulation size for e.g., GMSK-GMSK, GMSK-8PSK, 8PSK-GMSK and 8PSK-8PSK scenarios or detection of a single 8PSK signal in the I/Q domain with additional I/Q whitening capability. Although we are primarily interested in a single receiver antenna, we present the algorithm for the general case of N receiver antennas. Further we assume that the received signal comprises $M_1$ GMSK co-channel signals and $M_2$ 8PSK signals and an additive noise component, which may include the sum of residual co-channel or adjacent channel interfering signals and thermal noise. Then the complex base band signal at the kth sampling instant can be represented as:

$$r_{k,q} = \qquad (1)$$

-continued
$$\sum_{i1=1}^{M_1}\sum_{m=0}^{L} h_m^{(i_1,q)} a_{(k-m,i_1)} e^{j\phi_{k-m}} + \sum_{i2=1}^{M_2}\sum_{m=0}^{L} h_m^{(i_2,q)} b_{(k-m,i_2)} e^{j\theta_{k-m}} + n_k^q,$$

$$q = 1, \ldots, NS \text{ where } \phi_k = \frac{\pi k}{2}, \theta_k = \frac{3\pi k}{8}$$

are the modulation dependent constellation rotation factors as defined in the GSM/EDGE standard. For each symbol index k, the receiver collects NS samples corresponding to an over-sampling factor of S at in case of N receiver antennas. Further $h_m^{(i_1,q)}$ and $h_m^{(i_2,q)}$ denote the channel coefficients for mth tap, at the qth over sampled observation, corresponding to $i_1$th binary symbol source $a_{k-m,i_1}$, and $i_2$ 8PSK complex symbol source $b_{k-m,i_2}$ respectively. Further we assume that the channel length is equal to L+1 for all signals.

When the data are contained in one format, then one sum in the preceding equation is the data and the other sum is the interfering signal to be subtracted. According to the embodiment illustrated, when the data are contained in two formats (GMSK and 8PSK), the interfering signals are in the $n_i$; i.e. this example is not directed at the case when the data are GMSK and 8PSK and there is significant interference.

Those skilled in the art will be able to generalize the example presented to handle interference by adding sums to equation 1 with channel coefficients that represent the interfering channel.

The base band received signal, which is a sum of at least one GMSK or at least one 8PSK signal, is first de-rotated with a factor $e^{-j\phi_k}$ such that all the component GMSK signals are forced to be binary modulated. The de rotated base band signal can be represented as $$e^{-j\phi_k} r_{k,q} = \sum_{i1=1}^{M_1}\sum_{m=0}^{L} \tilde{h}_m^{(i_1,q)} a_{(k-m,i_1)} + \sum_{i2=1}^{M_2}\sum_{m=0}^{L} \tilde{h}_m^{(i_2,q)} \tilde{b}_{(k-m,i_2)} + \tilde{n}_k^q \qquad (2)$$

where the de-rotated quantities are denoted by the tilde symbol. Since 8PSK is a complex modulation alphabet, multiplication with a complex de-rotation factor yields a constellation rotated 8PSK modulation.

After de-rotation, we split the real (I) and imaginary (Q) parts of the de-rotated GMSK-8PSK composite signal and represent in column vector format as:

$$y_{k,q} = \qquad (3)$$

$$\sum_{i1=1}^{M_1}\sum_{m=0}^{L} H_{a,m}^{(i_1,q)} a_{(k-m,i_1)} e^{j\phi_{k-m}} + \sum_{i2=1}^{M_2}\sum_{m=0}^{L} H_{c,m}^{(i_2,q)} c_{(k-m,i_2)} e^{j\theta_{k-m}} + \hat{n}_k^q$$

$$\text{where } y_{k,q} = \begin{pmatrix} \operatorname{Re}[e^{-j\phi_k} r_{k,q}] \\ \operatorname{Im}[e^{-j\phi_k} r_{k,q}] \end{pmatrix}$$

is the I-Q received samples in stacked up in column format, $$H_{a,m}^{i_1,q} = \begin{pmatrix} \operatorname{Re}[\tilde{h}_m^{i_1,q}] \\ \operatorname{Im}[\tilde{h}_m^{i_1,q}] \end{pmatrix}$$

is the I-Q parts of GMSK channel stacked up in column format, $$c_{k-m,i_2} = \begin{pmatrix} \text{Re}[\tilde{b}_{k-m}^{i_2}] \\ \text{Im}[\tilde{b}_{k-m}^{i_2}] \end{pmatrix}$$

is the column vector filled with I-Q parts of 8PSK symbol, and $$H_{c,m}^{i_2,q} = \begin{pmatrix} \text{Re}[\tilde{h}_m^{i_2,q}] & -\text{Im}[\tilde{h}_m^{i_2,q}] \\ \text{Im}[\tilde{h}_m^{i_2,q}] & \text{Re}[\tilde{h}_m^{i_2,q}] \end{pmatrix}$$

is the corresponding 8PSK I-Q matrix channel, and $$\hat{n}_k^q = \begin{pmatrix} \text{Re}[\tilde{n}_k^q] \\ \text{Im}[\tilde{n}_k^q] \end{pmatrix}$$

is the residual noise vector after I-Q split.

The 8PSK I-Q matrix channel $$H_{c,m}^{i_2,q}$$

is orthogonal due to the inherent I-Q orthogonality.

Note that after de-rotation and I-Q split, we have three data modulation formats—binary data streams from GMSK sources and real and imaginary data streams from the 8PSK sources.

Further $y_{k,q}$ is represented in compact matrix form as:

$$y_{k,q} = \sum_{m=0}^{L} H_m^q d_{k-m} + \hat{n}_k^q \quad (4)$$

in which we further stacked the I-Q parts of GMSK and 8PSK channel and data matrices in matrix format as:

$$H_m^q = [H_{a,m}^{1,q} \; H_{c,m}^{1,q} \; \cdots \; H_{a,m}^{M_1,q} \; H_{c,m}^{M_2,q}] \text{ and}$$

$d_{k-m} = [a_{(k-m,1)} \; c_{k-m,1}^T \; \ldots \; a_{(k-m,M_1)} \; c_{k-m,M_2}^T]^T$ is a column vector filled with I-Q parts of GMSK and 8PSK symbols. Note that the superscript symbol T denotes a matrix transpose operation.

We further stack the over samples corresponding to kth sample from all receiver antennas in column format as:

$y_k = [y_{k,1}^T \ldots y_{k,q}^T \ldots y_{k,NS}^T]^T$

Then we get the following compact signal definition $$y_k = \sum_{m=0}^{L} \hat{H}_m d_{k-m} + n_k \quad (5)$$

i. where $\hat{H}_m = \begin{bmatrix} H_m^1 \\ \vdots \\ H_m^{NS} \end{bmatrix}$ and $n_k = \begin{bmatrix} n_k^1 \\ \vdots \\ n_k^{NS} \end{bmatrix}$ We then filter the received vector $y_k$ with a set of feed forward weights w such that the filtered signal has an impulse response with most of the energy concentrated in the first few taps. This type of filter is also referred to as a channel-shortening filter in the literature. The weights are chosen to minimize the error term defined as $e_k = w^T y_{k+L_f:k} - B d_{k:k-L}$
where B denotes the I-Q MIMO feedback filter.

We use the notation where $y_{k+L_f:k}$ is a vector that contains the blocks $y_{k+L_f}, \ldots y_k$, where each block is a vector of size 2NS×1. Note that we have assumed a finite length feed forward filter of length $L_f$. The feed forward filtered received signal $x_k = w^T y_{k+L_f:k}$ has the following signal structure $$x_k = \sum_{l=0}^{L} B_l d_{k-l} + e_k$$

We further define the error auto correlation matrix as $R_{ee} \approx E[e_k e_k^T]$ We then optimize the filter coefficients according to the minimum mean square error (MMSE) criterion by minimizing the trace of the error autocorrelation matrix $R_{ee}$ $$w^{opt}, B^{opt} = \arg \min_{w,B} \text{Trace}(R_{ee})$$

such that first tap of the feedback filter matrix is constrained to be $B_0 = I$ or a lower triangular matrix.

The pre filtering step thus allows a decision feedback equalizer (DFE) or a reduced state sequence estimation (RSSE) algorithm can be applied.

A subsequent reduced state soft output sequence estimation algorithm (using one of MAP/Max-Log-MAP/SOVA algorithms) jointly detects the I/Q symbol streams using the shortened impulse response $B^{opt}$. Furthermore, the constellation rotated 8PSK symbol set will be used in the equalizer branch metric computations. The branch metric is given by $$d^2(k) = \left(x_k - d_k - \sum_{l=1}^{L} B_l \hat{d}_{k-l}\right)^T R_{ee}^{-1} \left(x_k - d_k - \sum_{l=1}^{L} B_l \hat{d}_{k-l}\right) \quad (6)$$

where $\hat{d}$ indicates the state dependent path history vector in a joint RSSE algorithm. We note the difference between the novel branch metric above made up with I-Q parts of the composite signals, and a conventional branch metric defined using complex quantities.

The result of the foregoing is that the desired signal emerges from the MIMO process, with the interfering signal removed as part of the sequence estimation process. A similar procedure is followed in mobile stations 100 and 200.

The I/Q MIMO MMSE framework described above includes the following scenarios as special cases.

By setting M1=0 and M2=1, the invention can be configured as an 8PSK blind I/Q interference suppression receiver when a GMSK interferer is present.

The invention can be configured as GMSK-8PSK or 8PSK-GMSK I/Q MIMO MMSE joint detection receiver if we let M1=1 and M2=1

The invention can be configured as 8PSK-8PSK I/Q MIMO MMSE receiver if we let M1=0 and M2=2. In this mode the receiver jointly detects two 8PSK signals and rejects any residual GMSK interference through I-Q whitening.

The invention can be configured as GMSK-GMSK I/Q MIMO MMSE receiver if we let M1=2 and M2=0. In this mode the receiver jointly detects two GMSK signals and rejects any residual GMSK interference through I-Q whitening.

Many other possibilities include for instance joint detection of 3 or more signals (for example 2 GMSK and one 8PSK) in I-Q domain.

In a practical implementation, the receiver can be made to switch between the above realizations by examining the desired and interfering signal channel estimates. Those skilled in the art will readily be able to set up criteria for switching, based on their needs.

Joint Channel Estimation

In an optional version of a system according to the invention, a receiver sequentially estimates the desired and dominant interfering transmissions and applies the cancellation process described above.

In this section we outline a joint channel estimation method that estimates the desired and dominant interferer signal channel impulse responses. The channel estimation method blindly (without a priori knowledge) identifies the dominant interferer modulation type (GMSK or 8PSK) and its training sequence (TRS) number during the estimation process. The modulation identification is done by exploiting the $e^{j\pi k/2}$, $e^{j3\pi k/8}$ constellation rotations associated with GMSK and 8PSK modulations respectively, where a TRS identification is made possible by formulating a maximal likelihood metric (or a simple correlation or least squares or LMMSE metric) over all possible desired and interference training sequence pairs.

In one embodiment of the invention, the receiver may first identify the desired signal modulation type and training sequence number by searching through the known relatively small number of training sequences. Next, the receiver analyzes the residual signals to identify the type of interference that is dominant.

In more detail, the estimation method consists of the following steps:

First, de-rotate the received signal by $e^{j\pi k/2}$ as above. The de-rotation process forces the GMSK component signals to be binary.

Then solve for the channel estimate using one of maximal likelihood (ML), or least minimum mean square estimation (LMMSE) or another convenient method of optimization for all possible desired and interference training pairs. Solve for the channel estimate $\tilde{H}_l$ using the following ML metric $$\min_{\tilde{H}_l} \left\| y_k - \sum_{m=0}^{L} \tilde{H}_l d_{k-m} \right\|^2 \quad (7)$$

In another embodiment of the invention, a reduced complexity implementation may be devised such that the interfering modulation type and TRS number are estimated sequentially, then a final ML joint channel estimate can be made once all modulation types and TRS numbers are estimated.

Implementation Alternatives

The invention provides many implementation alternatives:

The preceding discussion has implicitly assumed that the interfering signal is unwanted. In one embodiment of the invention, the base station transmits two signals on the same channel, with both the signals being part of the message. In that case, both signals are important and need to be detected accurately.

The base station transmits the signals on two (or more) different spatially separated antennas. The receiving station has only a single antenna and applies one of the techniques described above to separate the two signal streams and discard interference between the streams.

When both the signals are GMSK, the data rate can be doubled. When one signal is GMSK and the other is 8PSK, the data rate can be improved by a factor of 4/3.

If 8PSK is the desired signal and GMSK is the source of interference, the invention can be configured as an 8PSK blind I/Q whitener that whitens the GMSK signal as colored noise in I/Q space.

Alternatively, if 8PSK is the desired signal and GMSK is the source of interference, the invention can jointly detect desired and interfering signals in I/Q space. Similarly, if GMSK is the desired signal and 8PSK is treated as CCI, the same algorithm can be used for interference cancellation (IC). If 8PSK is the desired signal and the CCI comprises a dominant 8PSK and a residual GMSK interferer, the algorithm can jointly detect two 8PSK signals and also whitens the GMSK interference in I/Q space For example, an alternate version of the invention includes a subsystem for detecting whether the transmission-receiver system is in a first transmission mode in which the interfering signal is to be discarded (i.e. the second signal is directed at another mobile station, etc.) or is in a second transmission mode in which the first signal and the second signal are both to be processed as data (i.e. the high data rate modes discussed above); and processing the second signal accordingly (e.g. discarding or saving it).

A transmission system may be set up with a convention such that the default primary format is GSM and a secondary format of e.g. 8PSK indicates that the high data rate mode is on, so that the second signal is to be saved and combined with the first signal; while a secondary signal having another format is to be discarded.

Although the invention has been described with respect to a limited number of embodiments, those skilled in the art will appreciate that other embodiments may be constructed within the spirit and scope of the following claims.

We claim:

1. A method, comprising:
receiving a composite wireless communication signal by a receiver;
de-rotating a corresponding complex composite base band received signal;
splitting the de-rotated corresponding complex composite base band received signal into an inphase domain portion and a quadrature domain portion, where de-rotating and splitting yield modulation formats comprising binary, inphase domain and quadrature domain data streams; and
performing, on the split corresponding complex composite base band received signal, joint signal detection separately in inphase domain and quadrature domain, where the joint signal detection comprises performing pre-filtering and reduced state sequence estimation separately on the inphase domain portion and the quadrature domain portion, where the composite wireless communication signal comprises a desired signal and an interfering signal, where the joint signal detection operates to suppress interference from the interfering signal.

2. The method of claim 1, where the corresponding complex composite base band received signal is comprised of real modulation signals, complex modulation signals or a combination of real and complex modulation signals, where the real modulation signal is a GMSK signal, where de-rotating comprises de-rotating the corresponding complex composite base band received signal in complex space such that the GMSK signal is binary modulated.

3. The method of claim 1, where the corresponding complex composite base band received signal comprises at least one GMSK signal, where de-rotating comprises de-rotating the corresponding complex composite base band received signal with a factor $e^{-j\Phi_k}$ such that the at least one GMSK signal is forced to be binary modulated.

4. The method of claim 1, where pre-filtering comprises using a set of feed forward weights to minimize an error term that includes a MIMO feedback filter, wherein a feed forward filter separately filters the inphase domain portion and the quadrature domain portion.

5. The method of claim 4, where pre-filtering comprises optimizing filter coefficients according to a minimum mean square error (MMSE) criterion.

6. The method of claim 1, where reduced state sequence estimation comprises use of a reduced state soft output sequence estimation that employs a branch metric comprised of inphase domain and quadrature domain components of the corresponding complex composite base band received signal.

7. The method of claim 1, where said steps of receiving, splitting and performing are performed in an 8PSK blind I-Q interference suppression receiver when a GMSK interferer is present.

8. The method of claim 1, where said steps of receiving, splitting and performing are performed in a GMSK-8PSK or 8PSK-GMSK I-Q MIMO minimum mean square error (MMSE) joint detection receiver.

9. The method of claim 1, where said steps of receiving, splitting and performing are performed in an 8PSK-8PSK I-Q MIMO minimum mean square error (MMSE) receiver that jointly detects at least two 8PSK signals and rejects residual GMSK interference using I-Q whitening.

10. The method of claim 1, where said steps of receiving, splitting and performing are performed in a GMSK-GMSK I-Q MIMO minimum mean square error (MMSE) receiver that jointly detects at least two GMSK signals and rejects residual GMSK plus 8PSK interference using I-Q whitening.

11. The method of claim 1, further comprising sequentially estimating desired and dominant interfering signal channel impulse responses, where channel estimation blindly identifies a dominant interferer modulation type and its training sequence.

12. The method of claim 11, where modulation identification comprises use of $e^{j\pi k/2}$, $e^{j3\pi l/8}$ constellation rotations associated with GMSK and 8PSK modulations, respectively, and where training sequence identification comprises use of an estimation metric over a plurality of possible interference training sequence pairs.

13. The method of claim 11, where identifying the dominant interferer modulation type and training sequence comprises searching through known training sequences, and analyzing residual signals to identify a type of dominant interference.

14. The method of claim 1 further comprising, sequentially estimating interfering modulation type and training sequence, and performing a maximum likelihood joint channel estimate after all modulation types and training sequences are estimated.

15. The method of claim 1, further comprising detecting whether operation of the device is in a first mode in which the interfering signal is to be discarded or in a second mode in which the desired signal and the interfering signal are to be processed as data, where in the first mode the interfering signal is discarded.

16. A wireless transmission system comprising:
   at least one base station having at least two spatially separated antennas and at least one RF unit configured to transmit a GMSK signal or an 8PSK signal along each of said two spatially separated antennas; and
   at least one receiving station configured to communicate with said base station;
   where said at least one receiving station comprises means for receiving a composite wireless communication signal, means for de-rotating a corresponding complex composite base band received signal, means for splitting the corresponding complex composite base band received signal into an inphase domain portion and a quadrature domain portion and means for performing, on the split corresponding complex composite base band received signal, joint signal detection separately in inphase domain and quadrature domain, where the means for de-rotating and the means for splitting yield modulation formats comprising binary, inphase domain and quadrature domain data streams, where the means for performing joint signal detection is further for performing pre-filtering and reduced state sequence estimation separately on the inphase domain portion and the quadrature domain portion, where the composite wireless communication signal comprises a desired signal and an interfering signal, where the joint signal detection operates to suppress interference from the interfering signal.

17. A system according to claim 16, in which said base station transmits two transmission signals on a same channel.

18. A system according to claim 17, in which said two transmission signals comprise two GMSK signals, two 8pSK signals or one GMSK signal and one 8PSK signal.

19. A system according to claim 16, in which two transmission signals are transmitted by a same base station using two antennas or are transmitted by a plurality of base stations each using one antenna.

20. A wireless transmission system comprising:
   at least one base station having at least one antenna and at least one RF unit configured to transmit a GMSK signal or an 8PSK signal; and
   at least one receiving station configured to communicate with said base station;
   where said receiving station comprises means for receiving a composite wireless communication signal, means for de-rotating a corresponding complex composite base band received signal, means for splitting the corresponding complex composite base band received signal into an inphase domain portion and a quadrature domain portion and means for performing, on the split corresponding complex composite base band received signal, joint signal detection separately in inphase domain and quadrature domain, where the means for de-rotating and the means for splitting yield modulation formats comprising binary, inphase domain and quadrature domain data streams, where the means for performing joint signal detection is further for performing pre-filtering and reduced state sequence estimation separately on the inphase domain portion and the quadrature domain portion, where the composite wireless communication signal comprises a desired signal and an interfering signal, where the joint signal detection operates to suppress interference from the interfering signal.

21. A device comprising:
a receiver configured to receive a composite wireless communication signal; and
a processor configured to de-rotate a corresponding complex composite base band received signal, to split the corresponding complex composite base band received signal into an inphase domain portion and a quadrature domain portion and to perform, on the split corresponding complex base band received signal, joint signal detection separately in inphase domain and quadrature domain, where de-rotating and splitting the corresponding complex composite base band signal by the processor yield modulation formats comprising binary, real and imaginary data streams, where the joint signal detection comprises performing pre-filtering and reduced state sequence estimation separately on the inphase domain portion and the quadrature domain portion, where the composite wireless communication signal comprises a desired signal and an interfering signal, where the joint signal detection operates to suppress interference from the interfering signal.

22. The device of claim 21, where said receiver is coupled to a plurality of receive antennas.

23. The device of claim 21, where the corresponding complex composite base band received signal is comprised of real modulation signals, complex modulation signals or a combination of real and complex modulation signals, where the real modulation signal is a GMSK signal, and where de-rotating the corresponding complex composite base band received signal comprises de-rotating the corresponding complex composite base band received signal in complex space with a factor such that the GMSK signal is binary modulated.

24. The device of claim 21, where the corresponding complex composite base band received signal comprises at least one GMSK signal, and where de-rotating the corresponding complex composite base band received signal comprises de-rotating the corresponding complex composite base band received signal with a factor $e^{-j\Phi_k}$ such that the at least one GMSK signal is forced to be binary modulated.

25. The device of claim 21, where performing pre-filtering by said processor comprises using a set of feed forward weights to minimize an error term that includes a MIMO feedback filter.

26. The device of claim 25, where performing pre-filtering by said processor comprises optimizing filter coefficients according to a minimum mean square error (MMSE) criterion.

27. The device of claim 21, where performing reduced state sequence estimation by the processor comprises performing a reduced state soft output sequence estimation procedure using a branch metric comprised of inphase domain and quadrature domain components of the corresponding complex composite base band received signal.

28. The device of claim 21, where said receiver and said processor are configured as an 8PSK blind I-Q interference suppression receiver when a GMSK interferer is present.

29. The device of claim 21, where said receiver and said processor are configured as a GMSK-8PSK or 8PSK-GMSK I-Q MIMO minimum mean square error (MMSE) joint detection receiver.

30. The device of claim 21, where said receiver and said processor are configured as an 8PSK-8PSK I-Q MIMO minimum mean square error (MMSE) receiver operable to jointly detect at least two 8PSK signals and to reject residual GMSK interference using I-Q whitening.

31. The device of claim 21, where said receiver and said processor are configured as a GMSK-GMSK I-Q MIMO minimum mean square error (MMSE) receiver operable to jointly detect at least two GMSK signals and to reject residual GMSK interference using I-Q whitening.

32. The device of claim 21, where said processor is further configured to sequentially estimate desired and dominant interfering signal channel impulse responses, where channel estimation blindly identifies a dominant interferer modulation type and its training sequence.

33. The device of claim 32, where modulation type identification comprises use of $e^{j\pi k/2}$, $e^{j3\pi k/8}$ constellation rotations associated with GMSK and 8PSK modulations, respectively, and where training sequence identification comprises use of an estimation metric over a plurality of possible interference training sequence pairs.

34. The device of claim 32, where said processor is configured to identify the dominant interferer modulation type and training sequence using a search through known training sequences, and an analysis of residual signals to identify a type of dominant interference.

35. The device of claim 21, where said processor is further configured to sequentially estimate interfering modulation type and training sequence, and to perform a maximum likelihood joint channel estimate after all modulation types and training sequences are estimated.

36. The device of claim 21, where the composite wireless communication signal is received by the receiver from each of at least two spatially separated transmit antennas associated with at least one transmitter or from at least two transmitters.

37. The device of claim 36, where the receiver receives desired information from each of the at least two spatially separated transmit antennas.

38. The device of claim 37, where the processor is further configured to detect whether operation of the device is in a first mode in which the interfering signal is to be discarded or in a second mode in which the desired signal and the interfering signal are to be processed as data.

39. The device of claim 38, where in the first mode the interfering signal is discarded.

40. The device of claim 21, where the composite wireless communication signal comprises two signals that are received on a same channel and where the two signals comprise two GMSK signals, two 8PSK signals or one GMSK signal and one 8PSK signal.

41. The device of claim 21, where the processor is further configured to estimate channel parameters of the interfering signal by calculating channel parameters for all combinations of a desired signal and of said interfering signal and selecting the channel parameters that meet a criterion.

42. The device of claim 21, where the receiver is further configured to receive channel parameters of an interfering signal.

* * * * *

UNITED STATES PATENT AND TRADEMARK OFFICE
CERTIFICATE OF CORRECTION

PATENT NO. : 7,830,975 B2
APPLICATION NO. : 10/823196
DATED : November 9, 2010
INVENTOR(S) : Kuchi et al.

Page 1 of 1

It is certified that error appears in the above-identified patent and that said Letters Patent is hereby corrected as shown below:

Claim 12, col. 9, line 61 delete "$e^{j3\pi l/8}$" and insert -- $e^{j3\pi k/8}$ --.

Signed and Sealed this
First Day of February, 2011

David J. Kappos
*Director of the United States Patent and Trademark Office*